(12) United States Patent
Wang

(10) Patent No.: US 10,055,405 B2
(45) Date of Patent: Aug. 21, 2018

(54) COMPUTER-IMPLEMENTED DIRECTIONAL TRANSLATION METHOD AND APPARATUS

(71) Applicant: BEIJING BAIDU NETCOM SCIENCE AND TECHNOLOGY CO., LTD., Beijing (CN)

(72) Inventor: Fan Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/384,089

(22) Filed: Dec. 19, 2016

(65) Prior Publication Data

US 2017/0242848 A1 Aug. 24, 2017

(30) Foreign Application Priority Data

Feb. 24, 2016 (CN) .......................... 2016 1 0102699

(51) Int. Cl.
*G06F 17/27* (2006.01)
*G06F 17/28* (2006.01)
*G10L 15/20* (2006.01)

(52) U.S. Cl.
CPC ........ *G06F 17/2872* (2013.01); *G06F 17/271* (2013.01); *G06F 17/2854* (2013.01);
(Continued)

(58) Field of Classification Search
CPC ............... G06F 17/271; G06F 17/2755; G06F 17/2765; G06F 17/2836; G06F 17/28;
(Continued)

(56) References Cited

U.S. PATENT DOCUMENTS 5,268,839 A * 12/1993 Kaji ...................... G06F 17/271
704/10
5,826,220 A 10/1998 Takeda et al.
(Continued)

FOREIGN PATENT DOCUMENTS

CN 1426561 A 6/2003
CN 102467498 A 5/2012
(Continued)

OTHER PUBLICATIONS

Japan Patent Application No. 2016-245200; Reasons for Refusal; dated Feb. 27, 2018; 5 pages.
(Continued)

*Primary Examiner* — Vijay B Chawan
(74) *Attorney, Agent, or Firm* — Baker & Hostetler LLP

(57) ABSTRACT

The present disclosure presents a directional translation method and a directional translation apparatus based on artificial intelligence. The method includes: receiving directional translation information that is set by a user for translating a first word in a translation file into a second word; and translating the first word in the translation file into the second word. With the directional translation method and the directional translation apparatus based on artificial intelligence provided in the present disclosure, the word is translated directionally into a result needed, thereby improving accuracy and efficiency of translation.

12 Claims, 3 Drawing Sheets

(52) U.S. Cl.
CPC ........ *G06F 17/2863* (2013.01); *G06F 17/289* (2013.01); *G10L 15/20* (2013.01)

(58) Field of Classification Search
CPC ............. G06F 17/2827; G06F 17/2872; G06F 17/2775; G06F 17/2785; G06F 17/289; G06F 17/2735; G06F 17/2818; G06F 17/2863; G06F 17/30746; G06F 3/0482; G10L 15/20; G10L 15/26; G10L 15/265; H04M 2203/2061; H04M 3/42; H04M 2/4938; G09B 19/00; G09B 19/08
USPC .............................. 704/2–4, 7–10, 235, 277
See application file for complete search history.

(56) References Cited

U.S. PATENT DOCUMENTS

| | | | | | |
|---|---|---|---|---|---|
| 5,832,236 | A * | 11/1998 | Lee | ......................... | H04L 12/42 709/249 |
| 6,024,571 | A * | 2/2000 | Renegar | ................. | G09B 19/00 434/157 |
| 6,085,162 | A * | 7/2000 | Cherny | ............... | G06F 17/2735 704/2 |
| 6,275,789 | B1 * | 8/2001 | Moser | ................... | G06F 17/271 704/2 |
| 6,401,128 | B1 * | 6/2002 | Stai | ................... | H04L 29/12009 709/236 |
| 7,228,268 | B2 * | 6/2007 | Xun | ..................... | G06F 17/271 704/2 |
| 7,254,527 | B2 * | 8/2007 | Xun | ..................... | G06F 17/271 704/2 |
| 7,315,809 | B2 * | 1/2008 | Xun | ..................... | G06F 17/271 704/2 |
| 2001/0056352 | A1 * | 12/2001 | Xun | ..................... | G06F 17/271 704/277 |
| 2005/0055198 | A1 * | 3/2005 | Xun | ..................... | G06F 17/271 704/2 |
| 2005/0071173 | A1 * | 3/2005 | Xun | ..................... | G06F 17/271 704/277 |
| 2005/0137853 | A1 * | 6/2005 | Appleby | ............. | G06F 17/2827 704/9 |
| 2005/0171757 | A1 * | 8/2005 | Appleby | ............. | G06F 17/2827 704/2 |
| 2011/0224981 | A1 * | 9/2011 | Miglietta | ................ | G10L 15/26 704/235 |
| 2017/0139906 | A1 * | 5/2017 | Wang | .................. | G06F 17/2836 |

FOREIGN PATENT DOCUMENTS

| | | |
|---|---|---|
| CN | 104239291 A | 12/2014 |
| CN | 105183761 A | 12/2015 |
| JP | H09-081572 A | 3/1997 |
| JP | 2004-220616 A | 8/2004 |
| KR | 2009-0025137 A | 3/2009 |
| KR | 2015-0095061 A | 8/2015 |
| WO | WO 2001/082111 A2 | 11/2001 |

OTHER PUBLICATIONS

China Patent Application No. 201610102699.1; Office Action; dated Feb. 24, 2018; 13 pages.
Korea Patent Application No. 10-2016-0130689; Reason for Refusal; dated Sep. 20, 2017; 8 pages.

* cited by examiner

COMPUTER-IMPLEMENTED DIRECTIONAL TRANSLATION METHOD AND APPARATUS

CROSS-REFERENCE TO RELATED APPLICATIONS

This application is based on and claims a priority to Chinese Patent Application No. 201610102699.1, filed on Feb. 24, 2016, the entire content of which is incorporated herein by reference.

FIELD

The present disclosure relates to the field of artificial intelligence technology, and more particular to a computer-implemented directional translation method and a computer-implemented directional translation apparatus.

BACKGROUND

The short name of Artificial Intelligence is AI. It's a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. Among them, the speech recognition is the most important aspect.

For the same original word, translation tools may provide various translation results depending on the context. For instance, the word "apple" may be translated into 苹果 (a kind of fruit), 苹果公司 (Apple company), 苹果电脑 (Apple computer) and other words. Therefore, sometimes the translation result may be incorrect.

Candidate translation results may be provided in the related art. However, there candidate results may be not precise, so there wouldn't be a correct result even if it is selected by a user.

SUMMARY

Embodiments of the present disclosure provide a computer-implemented directional translation method. The method includes receiving at one or more computing devices directional translation information that is set by a user for translating a first word in a translation file into a second word; and translating at the one or more computing devices the first word in the translation file into the second word.

Embodiments of the present disclosure provide a computer-implemented directional translation apparatus. The apparatus includes one or more computing devices configured to execute one or more software modules, and the one or more software modules includes a first setting module configured to receive directional translation information that is set by a user for translating a first word in a translation file into a second word; and a translating module configured to translate the first word in the translation file into the second word.

Embodiments of the present disclosure provide a non-transitory computer-readable storage medium. The non-transitory computer-readable storage medium includes a computer program configured to execute the following acts on one or more computing devices: receiving directional translation information that is set by a user for translating a first word in a translation file into a second word; and translating the first word in the translation file into the second word.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
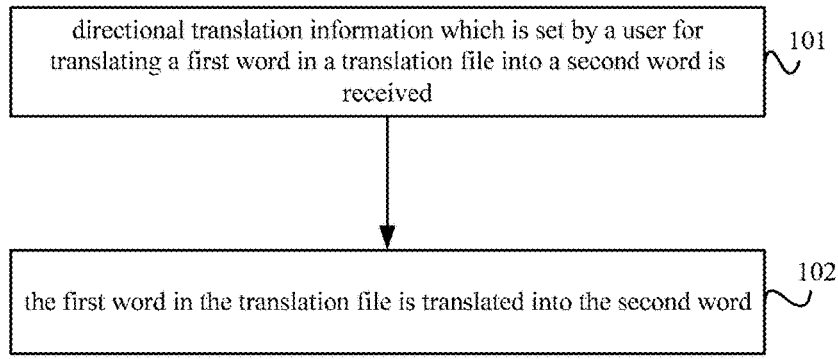
FIG. 1 is a flow chart of a computer-implemented directional translation method according to an embodiment of the present disclosure.

Reference will be made in detail to embodiments of the present disclosure. The embodiments described herein with reference to drawings are explanatory, illustrative, and configured to generally understand the present disclosure. The embodiments shall not be construed to limit the present disclosure. The same or similar elements and the elements having same or similar functions are denoted by like reference numerals throughout the descriptions.

The directional translation method and the directional translation apparatus according to embodiments of the present disclosure will be described with reference to drawings as follows.

FIG. 1 is a flow chart of a computer-implemented directional translation method according to an embodiment of the present disclosure.

As shown in FIG. 1, the computer-implemented method includes followings, and the followings may be performed on one or more computing devices.

In step 101, directional translation information that is set by a user for translating a first word in a translation file into a second word is received.

In step 102, the first word in the translation file is translated into the second word.

Specifically, for the same original word, different translation results may be provided by a translation tool according to the context. As the limitation of the translation tool, the translation result provided sometimes may be incorrect. Take "apple" for an example to describe as follows.

"Apple" may be translated into 苹果 (a kind of fruits), 苹果公司 (Apple Company), 苹果电脑 (Apple computer) or other words according to different applications.

A translation product may translate "Now twenty kinds of local products are available at the shop, including apples and pears." into "现在二十种本 地产品可在店内，包括：苹果和梨、". In this sentence, "apple" is desired to be translated into "苹果".

However, the translation product may translate "Apple gears up for November 11 shopping carnival with iPad Pro" into "苹果于 11 月 11 日购物狂欢与 iPad Pro". In this sentence, "apple" is desired to be translated into "苹果公司" or "Apple 公司".

Taking another example, "president" may be translated into "总统，主席，校长, or other words. For instance, "President Xi Jinping's state visit to the United Kingdom next week will usher in a "golden decade" and a new dimension for cooperation, former British Prime Minister Tony Blair said on Wednesday." may be translated into "英国前首相布莱尔星期二表示，习近平总统 对英国的国 事访问将迎来 一个" 黄金十年" 和合作的新维度。"

In this sentence, "President Xi Jinping" is translated into "习近平总统". However it is desired to translate "president" into "主席" herein.

In addition, in a paragraph with large length, some company names and names are desired to retain original English expressions without being translated.

Therefore, in order to improve accuracy and efficiency of translation, with the directional translation method based on artificial intelligence provided in the embodiment, by adding a translation setting tool into the translation product, the user may do directional setting of translation results according to his needs, such that the word in the translation file may be translated into the translation result that is designated by him.

It is assumed that the user needs to translate the first word in the translation file into the second word, and then the corresponding translation information is set. Furthermore, if the directional translation information that is set by the user for translating the first word in the translation file into the second word is received, the translation is started, so as to translate the first word appeared in the translation file into the second word.

The directional translation method according to embodiments of the present disclosure, by receiving the directional translation information that is set by the user for translating the first word in the translation file into the second word and by translating the first word in the translation file into the second word, may achieve that the word may be translated directionally into the result needed, thereby improving accuracy and efficiency of translation.

Figure 2:
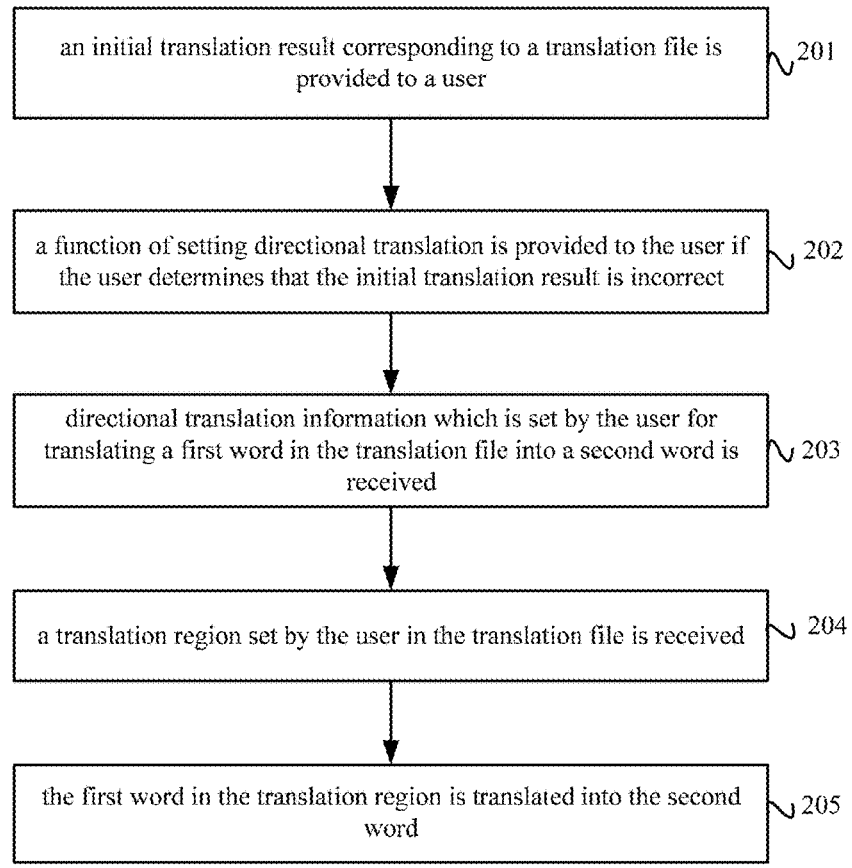
FIG. 2 is a flow chart of a computer-implemented directional translation method according to another embodiment of the present disclosure.

FIG. 2 is a flow chart of a computer-implemented directional translation method according to another embodiment of the present disclosure.

As shown in FIG. 2, the method includes followings, and the followings may be performed on one or more computing devices.

In step 201, an initial translation result corresponding to a translation file is provided to a user.

Specifically, the user may use a translation tool to translate the translation file. The translation tool may be an online tool, an off-line tool or other tools, which is not limited herein. The initial translation result corresponding to the translation file may be provided to the user after translation.

In step 202, a function of setting directional translation is provided to the user if the user determines that the initial translation result is incorrect.

Specifically, the user may check the initial translation result. If it is confirmed that the initial translation result is incorrect, the function of setting directional translation may be provided to the user by the translation tool.

It should be noted that, different translation tools may provide functions of setting directional translation to the user through hardware or software, so that the user may modify the incorrect initial translation result. Take some examples as follows.

Example 1

If it is informed that the user touches a translation identifier in an input box of the translation tool, a floating layer marked with a name of directional translation result is provided to the user, such that the user may set words translated incorrectly in the floating layer and may do directional translation setting of the corresponding translation result in the floating layer.

Example 2

If it is informed that the user touches a button of translation in the translation tool, an interaction interface marked with a directional translation result is provided to the user, such that the user may set words translated incorrectly in the interaction interface and may do directional translation setting of the corresponding translation result in the interaction interface.

In step 203, directional translation information that is set by the user for translating a first word in the translation file into a second word is received.

Specifically, in order to further improve efficiency of translation, if the first word translated incorrectly that is set by the user is received, a plurality of candidate words corresponding to the first word is provided to the user.

And then, if the user determines that a target translation result (i.e. the second word) belongs to the plurality of candidate words, the second word is directly selected from the plurality of candidate words as the translation result.

Furthermore, in order to avoid a case that the plurality of candidate words cannot meet needs, after receiving the first word set by the user, the method includes the followings.

A custom option is provided to the user, and the second word is customized by the user if the user determines that the target translation result (i.e. the second word) does not belong to the plurality of candidate words.

In step 204, a translation region set by the user in the translation file is received.

In step 205, the first word in the translation region is translated into the second word.

Specifically, it is assumed that there are several first words translated incorrectly in the translation file. In order to avoid amending the first word one by one, and further to improve efficiency and flexibility of translation, a function of selecting the translation region is provided to the user.

The user may select the translation region according to needs in the translation file to modify the corresponding word in the translation region. Furthermore, according to the directional translation setting of the user, the first word in the translation region is translated into the second word.

In order to illustrate the process of the above implementation more clearly, take schematic diagram interfaces shown in FIGS. 3-6 for example as follows.

Figure 3:
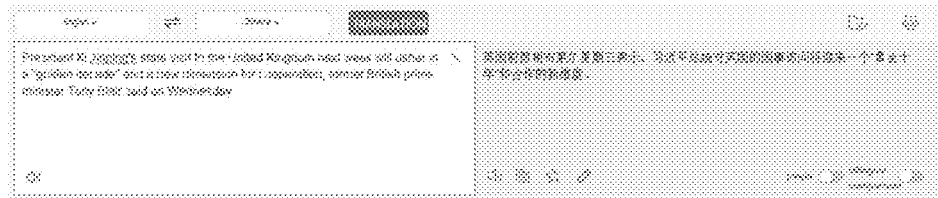
FIG. 3 is a schematic diagram of an initial translation result according to an embodiment of the present disclosure.

In step 1, FIG. 3 is a schematic diagram of an initial translation result. As shown in FIG. 3, if it is discovered that the translation result does not meet needs, the translation result translated incorrectly may be modified. For instance, the user discovers "President Xi Jinping" in the input box shown in FIG. 3 is translated into "习近平总统". However, it is desired to translate president into "主席".

Figure 4:
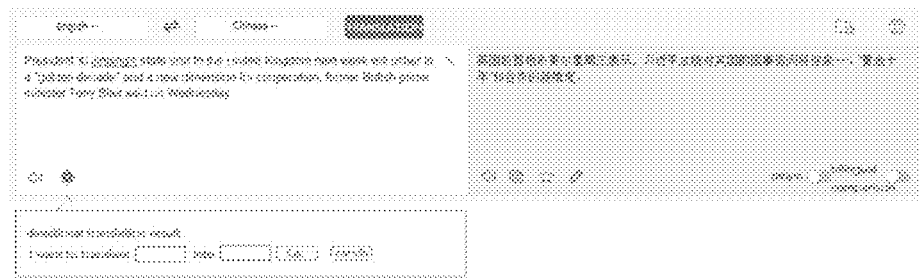
FIG. 4 is a schematic diagram of a function of setting directional translation according to an embodiment of the present disclosure.

In step 2, FIG. 4 is a schematic diagram of a function of setting directional translation. As shown in FIG. 4, if the user touches TRANSLATION in the input box, a floating layer marked with a name of directional translation result is appeared, in which the context is "I want to translate _____ into _____".

Figure 5:
FIG. 5 is a schematic diagram of a directional translation setting according to an embodiment of the present disclosure.

In step 3, FIG. 5 is a schematic diagram of a directional translation setting. As shown in FIG. 5, "a word which is desired to be translated (i.e. the above first word)" and "a translation result which is designated (i.e. the above second word)" are required to be filled in the lines respectively. "President" and "主席" are filled in herein.

Figure 6:
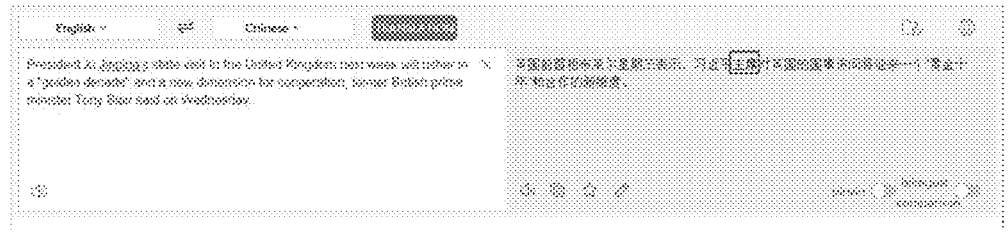
FIG. 6 is a schematic diagram of a directional translation result according to an embodiment of the present disclosure.

In step 4, FIG. 6 is a schematic diagram of a directional translation result. As shown in FIG. 6, after the user touches OK, the translation result is updated in the translation box, that is to say "习近平总统" is translated into "习近平主席".

The directional translation method according to embodiments of the present disclosure, may provide the function of setting directional translation to the user, if the user determines that the translation result is incorrect, and may receive the directional translation information that is set by the user for translating the first word in the translation file into the second word and the translation region which is set in the translation file by the user, and may translate the first word in the translation region into the second word. Thus, it is realized that the word is translated directionally into the result needed, and accuracy, efficiency and flexibility of translation is improved, thereby making the user to select the target translation region.

In order to achieve the above embodiments, embodiments of the present disclosure provide a computer-implemented directional translation apparatus.

Figure 7:
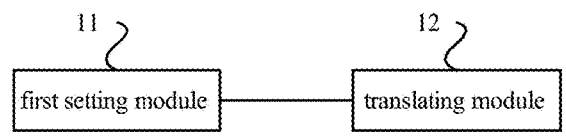
FIG. 7 is a schematic diagram of a computer-implemented directional translation apparatus according to an embodiment of the present disclosure.

FIG. 7 is a schematic diagram of a computer-implemented directional translation apparatus according to an embodiment of the present disclosure.

As shown in FIG. 7, the apparatus includes: a first setting module 11 and a translating module 12. The modules 11-12 may be configured to be executed by one or more computing devices.

The first setting module 11 is configured to receive directional translation information that is set by a user for translating a first word in a translation file into a second word.

The translating module 12 is configured to translate the first word in the translation file into the second word.

It should be noted that, the above explanations and illustrations of embodiments of the directional translation method based on artificial intelligence are also applicable to embodiments of the directional translation apparatus based on artificial intelligence, which is no description herein.

The directional translation apparatus according to embodiments of the present disclosure, by receiving the directional translation information that is set by the user for translating the first word in the translation file into the second word and by translating the first word in the translation file into the second word, may achieve that the word may be translated directionally into the result needed, thereby improving accuracy and efficiency of translation.

Figure 8:
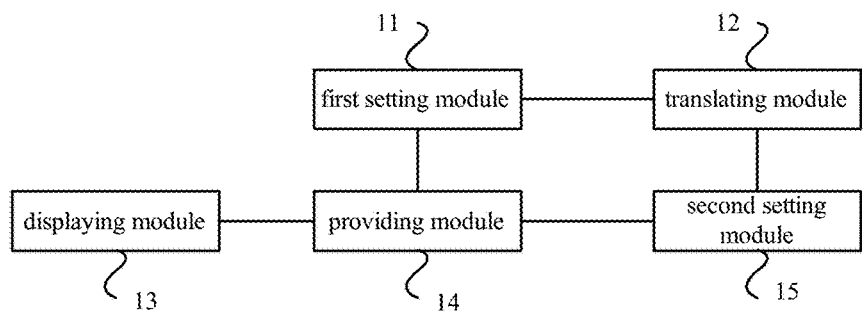
FIG. 8 is a schematic diagram of a computer-implemented directional translation apparatus according to another embodiment of the present disclosure.

FIG. 8 is a schematic diagram of a computer-implemented directional translation apparatus according to another embodiment of the present disclosure. As shown in FIG. 8, the apparatus further includes a displaying module 13 and a providing module 14 based on the embodiments shown in FIG. 7. The modules 13-14 may be configured to be executed by one or more computing devices.

The displaying module 13 is configured to provide an initial translation result corresponding to the translation file to the user.

The providing module 14 is configured to provide a function of setting directional translation to the user if the user determines that the initial translation result is incorrect.

It should be noted that, different translation tools may provide functions of setting directional translation to the user via hardware or software, so that the user may modify the incorrect initial translation result. Take some examples as follows.

In an embodiment, the providing module 14 is configured to provide a floating layer marked with a name of directional translation result if it is informed that the user touches a translation identifier in an input box, such that the user do directional translation setting for the words which are translated incorrectly.

In an embodiment, in order to further improve efficiency of translation, the first setting module 11 is configured to:

Receive the first word set by the user;

Provide a plurality of candidate words corresponding to the first word; and

Receive the second word selected from the plurality of candidate words by the user.

In another embodiment, the first setting module 11 is configured to:

Provide a custom option to the user;

Receive the second word set by the user;

Furthermore, the apparatus further includes a second setting module 15. The module 15 may be configured to be executed by one or more computing devices.

The second setting module 15 is configured to receive a translation region set by the user in the translation file.

The translating module 12 is configured to translate the first word in the translation region into the second word.

It should be noted that, the above explanations and illustrations of embodiments of the directional translation method based on artificial intelligence are also applicable to embodiments of the directional translation apparatus based on artificial intelligence, which is no description herein.

The directional translation apparatus according to embodiments of the present disclosure, may provide the function of setting directional translation to the user if the user determines that the translation result is incorrect, and may receive the directional translation information that is set by the user for translating the first word in the translation file into the second word and the translation region that is set in the translation file by the user, and may translate the first word in the translation region into the second word. Thus, it is realized that the word is translated directionally into the result needed, and accuracy, efficiency and flexibility of translation is improved, thereby making the user to select the targeted translation region.

Embodiments of the present disclosure also provide a non-transitory computer-readable storage medium. The non-transitory computer-readable storage medium includes a computer program configured to execute the above computer-implemented directional translation method on one or more computing devices.

In addition, in the description of the present disclosure, terms such as "first" and "second" are configured herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CD-ROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features or characteristics may be combined in any suitable manner in one or more embodiments or examples. Besides, any different embodiments and examples and any different characteristics of embodiments and examples may be combined without contradiction.

What is claimed is:

1. A computer-implemented directional translation method, comprising:
    receiving, at one or more computing devices, directional translation information that is set by a user for translating a first word in a translation file into a second word, wherein the receiving, at one or more computing devices, directional translation information that is set by a user for translating a first word in a translation file into a second word further comprises:
        receiving, at the one or more computing devices, the first word set by the user,
        providing, at the one or more computing devices, a plurality of candidate words corresponding to the first word,
        receiving, at the one or more computing devices, a candidate word selected from the plurality of candidate words by the user,
        providing, at the one or more computing devices, a custom option to the user such that the second word is customized by the user when the second word does not belong to the plurality of candidate words, and
        receiving, at the one or more computing devices, the second word set by the user; and
    translating, at the one or more computing devices, the first word in the translation file into the second word.

2. The method according to claim 1, before receiving, at one or more computing devices,
    directional translation information that is set by a user for translating a first word in a translation file into a second word, further comprising:
    providing, at the one or more computing devices, an initial translation result corresponding to the translation file to the user; and
    providing, at the one or more computing devices, a function of setting directional translation to the user if the user determines that the initial translation result is incorrect.

3. The method according to claim 2, wherein providing, at the one or more computing devices, a function of setting directional translation to the user, comprises:
    providing, at the one or more computing devices, a floating layer marked with a name of directional translation result if it is informed that the user touches a translation identifier in an input box, such that the user may perform directional translation setting on a word translated incorrectly.

4. The method according to claim 1, further comprising:
    receiving, at the one or more computing devices, a translation region set by the user in the translation file;
    translating, at the one or more computing devices, the first word in the translation file into the second word, comprises:
    translating, at the one or more computing devices, the first word in the translation region into the second word.

5. A computer-implemented directional translation apparatus, comprising one or more computing devices configured to execute one or more software modules, the one or more software modules comprising:
a first setting module, configured to receive directional translation information that is set by a user for translating a first word in a translation file into a second word, wherein the first setting module is further configured to:
receive the first word set by the user,
provide a plurality of candidate words corresponding to the first word,
receive, at the one or more computing devices, a candidate word selected from the plurality of candidate words by the user,
provide a custom option to the user such that the second word is customized by the user when the second word does not belong to the plurality of candidate words, and
receive the second word set by the user; and
a translating module, configured to translate the first word in the translation file into the second word.

6. The apparatus according to claim 5, wherein the one or more software modules further comprise:
a displaying module, configured to provide an initial translation result corresponding to the translation file to the user; and
a providing module, configured to provide a function of setting directional translation to the user if the user determines that the initial translation result is incorrect.

7. The apparatus according to claim 6, wherein the providing module is configured to:
provide a floating layer marked with a name of directional translation result if it is informed that the user touches a translation identifier in an input box, such that the user may perform directional translation setting on a word translated incorrect.

8. The apparatus according to claim 5, wherein the one or more software modules further comprise:
a second setting module, configured to receive a translation region set by the user in the translation file;
the translating module is configured to translate the first word in the translation region into the second word.

9. A non-transitory computer-readable storage medium comprising a computer program configured to execute the following acts on one or more computing devices:
receiving directional translation information that is set by a user for translating a first word in a translation file into a second word, wherein the receiving directional translation information that is set by a user for translating a first word in a translation file into a second word further comprises:
receiving the first word set by the user,
providing a plurality of candidate words corresponding to the first word,
receiving, at the one or more computing devices, a candidate word selected from the plurality of candidate words by the user,
providing a custom option to the user such that the second word is customized by the user when the second word does not belong to the plurality of candidate words, and
receiving the second word set by the user; and
translating the first word in the translation file into the second word.

10. The non-transitory computer-readable storage medium according to claim 9, wherein before receiving directional translation information that is set by a user for translating a first word in a translation file into a second word, the computer program is further configured to execute the following acts on one or more computing devices:
providing an initial translation result corresponding to the translation file to the user; and
providing a function of setting directional translation to the user if the user determines that the initial translation result is incorrect.

11. The non-transitory computer-readable storage medium according to claim 10, wherein providing a function of setting directional translation to the user comprises:
providing a floating layer marked with a name of directional translation result if it is informed that the user touches a translation identifier in an input box, such that the user may perform directional translation setting on a word translated incorrectly.

12. The non-transitory computer-readable storage medium according to claim 9, wherein the computer program is further configured to execute the following acts on one or more computing devices:
receiving a translation region set by the user in the translation file;
translating the first word in the translation file into the second word, comprises:
translating the first word in the translation region into the second word.

* * * * *